March 23, 1937. C. B. DUSHANE, JR 2,074,832
APPARATUS FOR DETERMINING THE CUBIC CAPACITY OF HOLLOW ARTICLES
Filed May 10, 1934  3 Sheets-Sheet 2
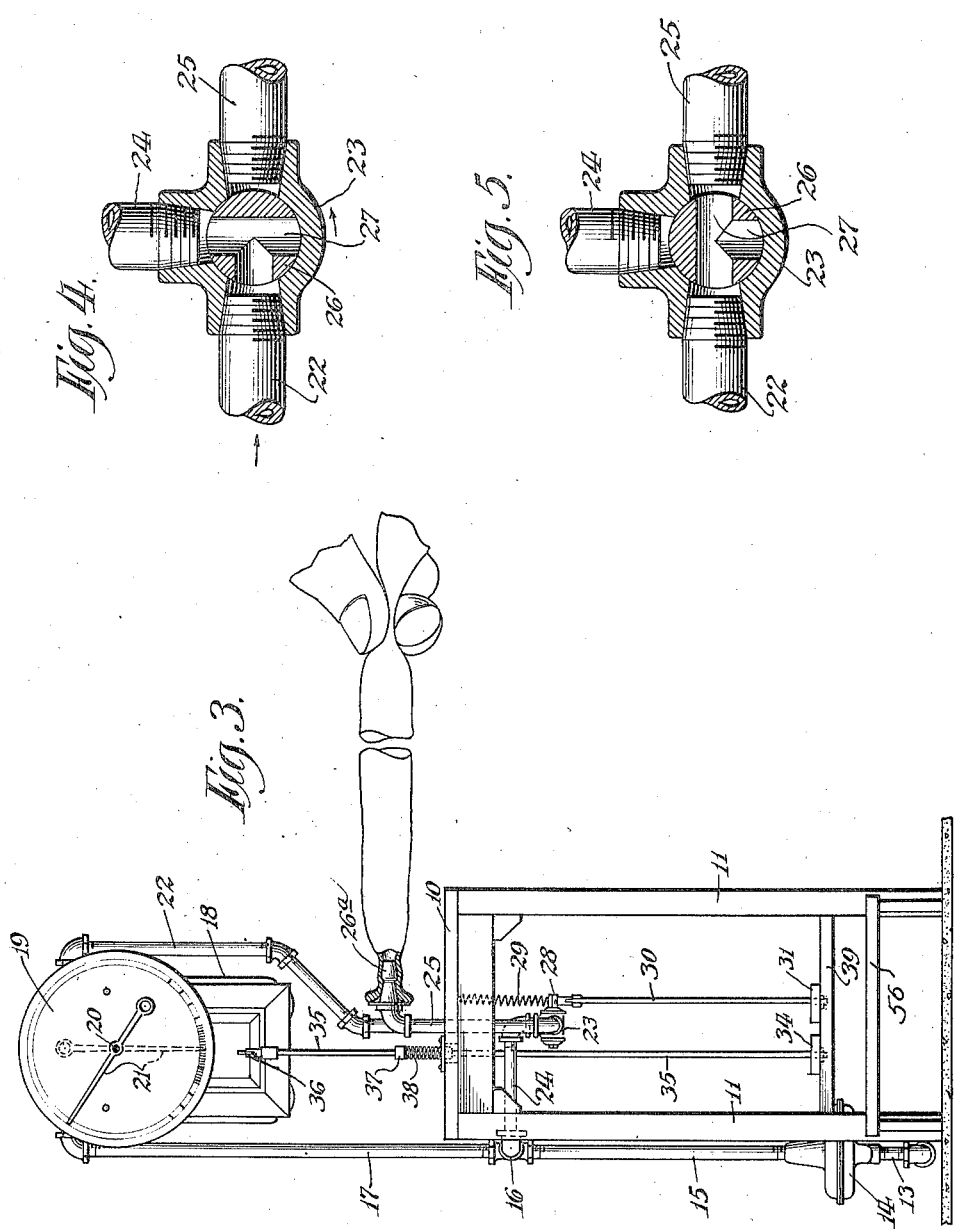
Inventor:
Charles B. Dushane Jr.
By Rector, Hibben, Davis & Macauley
Attorneys March 23, 1937.  C. B. DUSHANE, JR  2,074,832
APPARATUS FOR DETERMINING THE CUBIC CAPACITY OF HOLLOW ARTICLES
Filed May 10, 1934  3 Sheets-Sheet 3
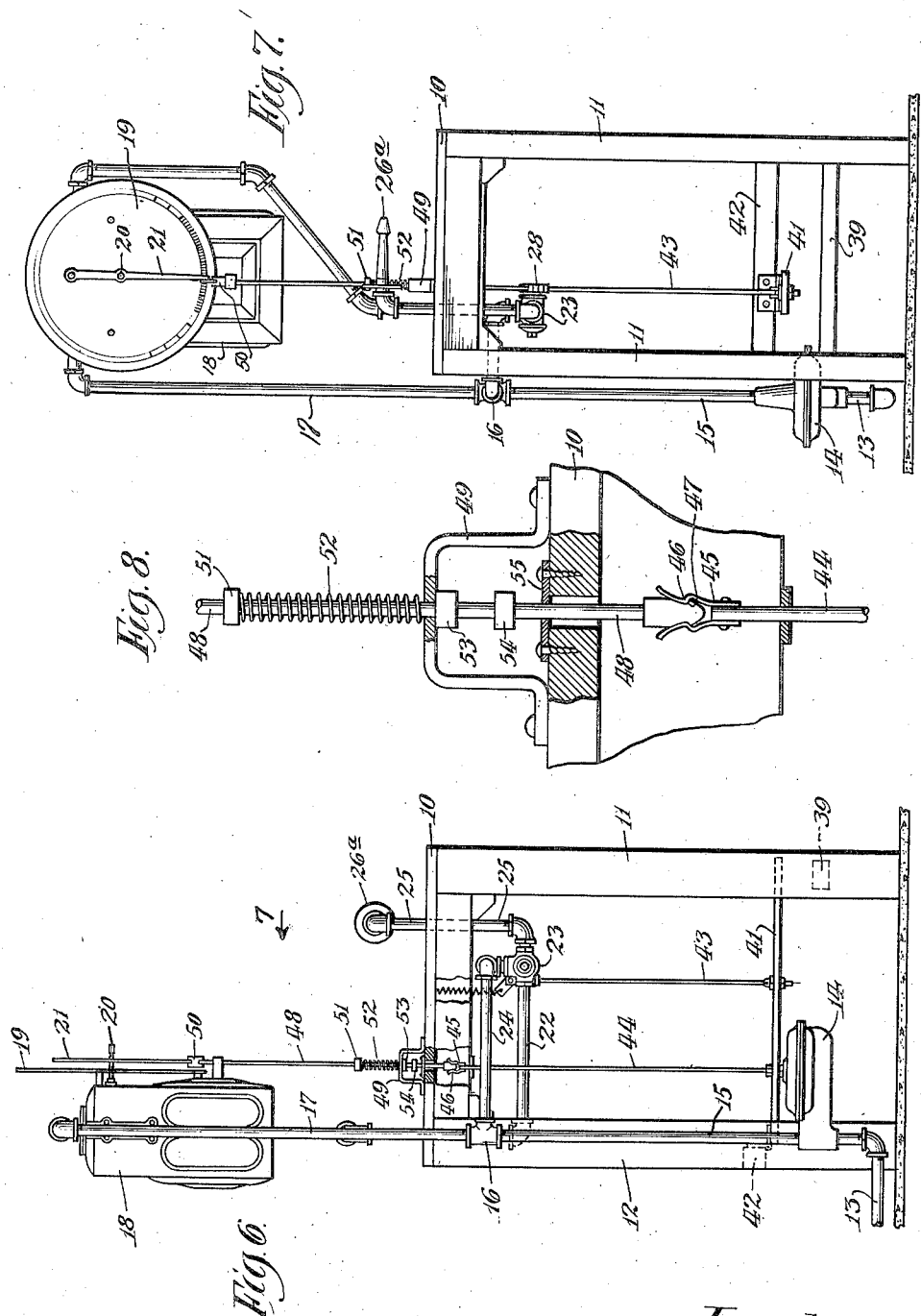
Inventor:
Charles B. Dushane Jr.
By Rector, Hibben, Davis & Macauley
Attorneys Patented Mar. 23, 1937

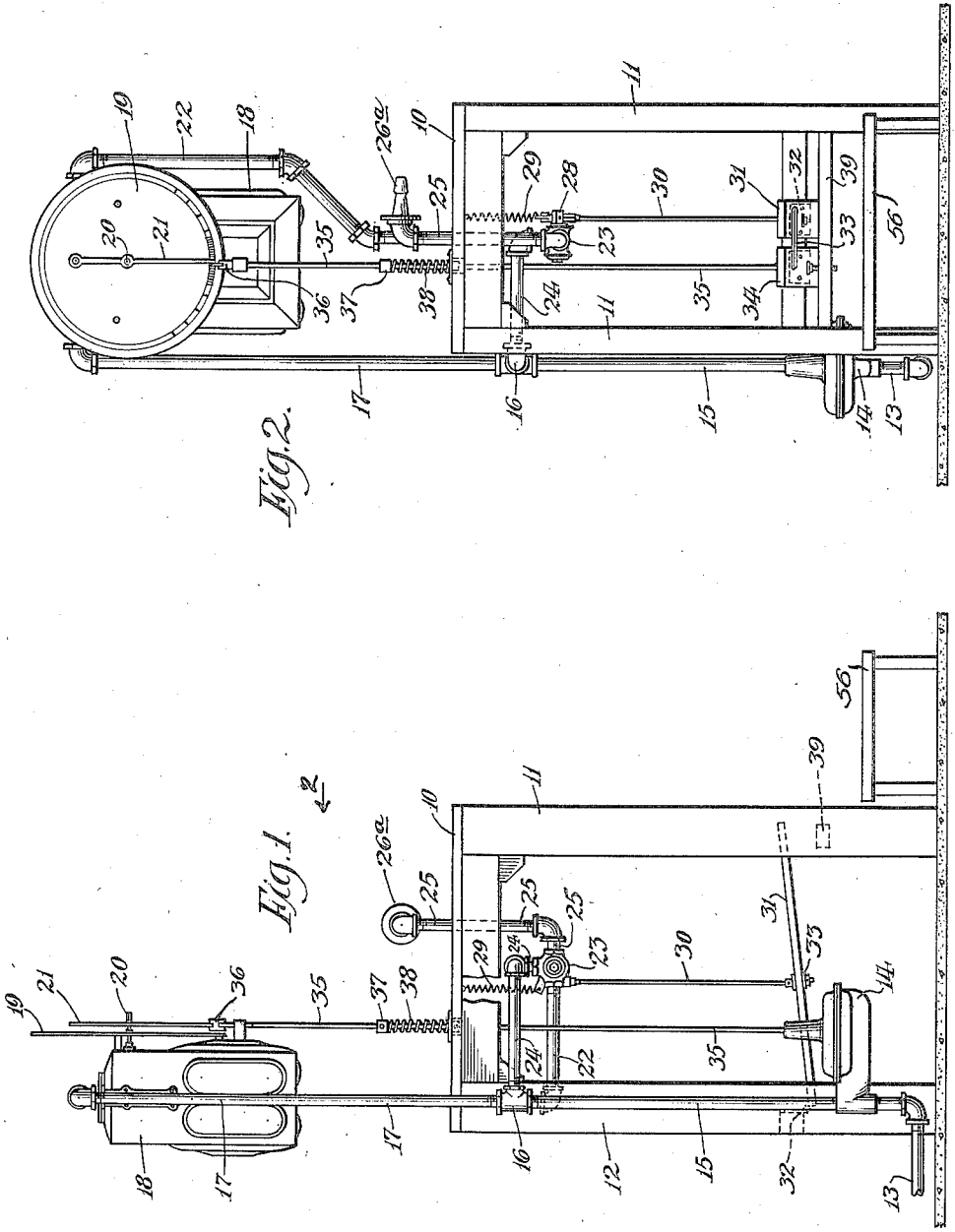

2,074,832

UNITED STATES PATENT OFFICE 2,074,832

APPARATUS FOR DETERMINING THE CUBIC CAPACITY OF HOLLOW ARTICLES

Charles B. Dushane, Jr., Chicago, Ill.

Application May 10, 1934, Serial No. 724,915

15 Claims. (Cl. 73—151)

My invention relates to an apparatus for determining the cubic capacity of hollow articles by measuring the quantity of a fluid required to fill the same and is concerned more particularly with ascertaining the stuffing capacity of hog bungs and other animal intestines which are employed as castings for sausages, Bolognas and other meat products.

As now practiced in the industry, hog bungs are gauged or graded by slipping the large or crown end over an air nozzle and closing the bung at some uniform distance therefrom. While the bung is thus filled with air, it is fitted between the prongs of a gauge at a predetermined distance from the crown in order to determine its size. The difficulty with this practice is that hog bungs not only taper generally from the crown to the small end, but each bung differs essentially from other bungs with respect to the location of bulges and constrictions in its length. Owing to this non-uniform characteristic, the determination of the cubic capacity of hog bungs by the foregoing method is largely in the nature of a rough approximation, since the gauge measurement is only made at one portion of the bung.

At the present time, hog bungs are graded into the following sizes: sows, exports, large primes, medium primes, small primes, narrow primes, and skips, and gauges are employed for each of these sizes. While hog bungs are sold according to the foregoing sizes, the buyer understands each size to mean a certain stuffing capacity, so that it is important to accurately ascertain this factor of the bung in order that its commercial size designation will more accurately reflect the amount of meat which the bung can contain.

It is therefore the principal object of my invention to devise an apparatus for sizing hog bungs which is adapted to make a volumetric determination of their capacity and to express the same, either in terms of pounds of meat, since the weight per cubic inch of any given sausage emulsion can be readily ascertained, or directly according to any of the foregoing sizes.

A further object is to devise an apparatus which employs a tinned steel case, gas meter of the so-called "Glover" type which is internally modified to operate on the finer calibration required and which operates with air as the measuring medium.

A further object is to devise an apparatus of the character indicated having a dial calibrated according to any given scheme, such as casing sizes, stuffing capacity and the like, and in which provision is made for returning the pointer to zero position after each measurement, thereby facilitating the use of the apparatus by unskilled labor and insuring a uniform point from which measurements are taken.

A further object is to devise an apparatus in which waste of the measuring medium between the gauging of successive hog bungs is prevented by equalizing the pressure on opposite sides of the meter, the shift from a continuous flow condition through the meter to one of equalized pressure and vice versa being effected automatically in the operation of the apparatus.

These and further objects of my invention will be set forth in the following specification, reference being had to the accompanying drawings, and the novel means by which said objects are effectuated will be definitely pointed out in the claims.

In the drawings:

Figure 1 is a side view of the apparatus.

Fig. 2 is a front view, as viewed in the direction of the arrow 2 in Fig. 1.

Fig. 3 is a view similar to Fig. 2, but showing an inflated hog bung connected to the apparatus and the pointer on the dial indicating the size of the bung, or its stuffing capacity, dependent upon the calibrating indicia on the dial.

Figs. 4 and 5 are sectional elevations of a three-way valve employed in connection with the apparatus, the former illustrating the position of the valve when the parts of the apparatus are relatively disposed as shown in Figs. 1 and 2, while Fig. 5 illustrates the valve position for the condition of the apparatus as shown in Fig. 3.

Fig. 6 is a side view corresponding to Fig. 1, but showing a modified type of apparatus.

Fig. 7 is a front view of the modification, looking in the direction of the arrow 7 in Fig. 6.

Fig. 8 is an enlarged view of the slip connection between the operating pedal and the pointer stop as shown in Fig. 6.

For purpose of illustration, my improved apparatus will be illustrated and described in connection with the volumetric determination of the capacity of hog bungs, but it will be understood that the generic conception is likewise capable of adaptation to, and use in connection with, the ascertainment of the cubic capacity of hollow objects in general, whether of regular or irregular shape, provided that they are capable of temporarily retaining a fluid of some nature, such as a gas.

Referring to Figs. 1 to 5, inclusive, of the drawings which illustrate one form of my apparatus, the numeral 10 designates a table provided with front legs 11 and rear legs 12. A pipe 13 leads from a suitable source of gas supply, preferably air, and is connected to an approved form of pressure regulator 14 located conveniently beneath the table and intended to appropriately reduce and maintain constant the pressure in the line leading to the meter, hereinafter described, and to prevent pulsation in this line.

The air passes from the regulator 14 into a pipe 15 which is connected at its remote end to a T connection 16. One end of a pipe 17 is threaded into the connection 16 and the other end is connected to the inlet side of a gas meter 18 having a suitably calibrated dial 19 through which extends a pintle 20 that is connected internally of the meter to the crank which is actuated by the metering mechanism. A pointer 21 is mounted on the pintle 20 for movement around the face of the dial 19.

The meter 18 is a tinned, steelcase, gas meter of the so-called "Glover" type, such as is customarily employed to measure gas for domestic service, but internally modified to measure smaller quantities of gas. This change consists in reducing the size of the measuring chambers, so that the sum of the four chambers equals one-ninth of a cubic foot or, in other words, so that one revolution of the crank motion of the meter equals one-ninth of a cubic foot. As indicated in the drawings, the dial 19 may be calibrated to one-ninth of a cubic foot in increments of single cubic inches, one revolution of the dial therefore indicating a measurement of one-ninth of a cubic foot of gas.

For the special type of service contemplated in the present instance, it is preferred that the face of the dial be calibrated according to casing sizes, utilizing letter or numeral designations, or in weight capacities, expressed in pounds, or the face of the dial may be marked off in segments, each of which would bear an appropriate trade-name, such as sows, exports, etc.

One end of a pipe 22 is connected to the delivery side of the meter 18 and extends downwardly beneath the top of the table 10 for connection to the casing of a three-way valve 23. One end of a pipe 24 is also connected to this casing and its opposite end is threaded into the connection 16. The casing is also connected to one end of a pipe 25 and the opposite end of the latter pipe has attached thereto a nozzle 26a which may be internally provided with an appropriate orifice for restricting the flow of air therethrough to an appropriate amount, such, as for example, 150 cubic feet per hour, in order to prevent a sudden and possible rupturing flow of gas into the hog bung, as hereinafter described.

A valve plug 26 is rotatably mounted within the casing 23 and is provided with a T-passage 27, whereby the pipe 22 may be appropriately connected to either of the pipes 24 or 25 during the operation of the apparatus. The plug projects externally of the casing and has an arm 28 affixed thereto. One end of a coil spring 29 is attached to the arm 28 and the opposite end is secured to the table 10, these parts being so arranged that the valve plug 26 is normally positioned by the spring as shown in Fig. 4. In order to rotate the plug 26 against the tension of the spring 29, one end of a link rod 30 is pivotally connected to the arm 28 and its opposite end is pivotally connected to a treadle 31 which is hinged to a bar 32 extending between the rear legs 12. An arm 33 is fixed to the underside of the treadle 31 and extends transversely thereof under a second treadle 34 which is also hingedly mounted on the bar 32. One end of a rod 35 is pivotally connected to the treadle 34 and extends upwardly and guidably through the top of the table 10 to a position adjacent the lower edge of the dial 19. A stop 36 is fixed on the upper end of the rod 35 and, in the position of the parts as shown in Fig. 2, is intended to engage with the end of the pointer 21 when the latter is registering with the zero of the dial. At an appropriate point above the surface of the table 10, a collar 37 is fixed to the rod 35 and a coil spring 38 encircles the rod between the collar and the table and tends to maintain the stop 36 in the pointer interrupting position shown in Fig. 2. A stop bar 39 is bridged between the legs 11 and serves to arrest the downward movement of the treadles.

In describing the operation of the type of apparatus under discussion, it will be assumed that the parts occupy the relative positions shown in Figs. 1 and 2 and that a constant air pressure is existent in supply line 13. Accordingly, for the position of the valve plug 26 shown in Fig. 4, there will be a certain air pressure, as determined by the regulator 14, existing at the inlet of the meter 18 and an equal pressure in the pipe 22 leading to the outlet of the meter, because the valve plug 26 connects the pipes 22 and 24. The inlet and outlet pressures on the meter will therefore be equalized, thus preventing flow of air through the meter and consequently avoiding any strain on the pointer 21.

The operator, who may stand on a platform 56, then grasps a hog bung and slips the crown end thereof over the nozzle 26a, as generally indicated in Fig. 3, and closes the bung at some convenient distance from the nozzle, one such distance having been determined as approximately 32 inches. For any given calibration of the dial, this distance is maintained for all bungs measured by the particular apparatus. The operator then moves the treadle 34 downwardly until stopped by the bar 39, and this action, through the bar 33, also simultaneously moves the treadle 31 in the same direction. This dual treadle movement simultaneously moves the stop 36 downwardly and thus frees the pointer for movement, and also rotates the valve plug 26 to the position shown in Fig. 5 to thereby place the delivery line 22 from the meter in communication with the pipe 25 leading to the nozzle 26a and closes communication of the pipe 22 with the pipe 24. Accordingly, the air must pass through the meter 18 and then through the pipe 22 for ultimate delivery to the hog bung. During this passage of the air through the meter, the pointer rotates around the dial until it is stopped by the back pressure created in the hog bung when the latter is completely filled. Assuming that the dial is suitably calibrated, the operator is immediately provided with a visual indication of the size of the hog bung which is a correct reflection of its stuffing capacity, or in other words, the bung is inflated to a size that approximates its size when stuffed with meat or other filling.

After the measurement has been obtained, the operator removes the bung from the nozzle and shifts his foot to the treadle 31 to thereby maintain the same in the position to which it has hitherto been moved, and thus frees the treadle 34 for return to the position shown in Figs. 1 and 2 under the impulse of the spring 38. This return movement places the stop 36 again in its interrupting position, but since the valve plug 26 remains in the position shown in Fig. 5, air continues to flow through the meter and is exhausted through the nozzle, thus returning the pointer to the zero position shown in Fig. 2. When the latter position is again reached, the operator releases the treadle 31 for return to the position shown in Fig. 1 under the impulse of the spring 29 and so places the valve plug 26 in the position shown in Fig. 4, when the pressures are equalized at the inlet and outlet of the meter. The apparatus is then conditioned for the measurement of the next hog bung with the pointer occupying a zero position that remains fixed throughout the operation of the apparatus, thus avoiding a shifting zero position for the pointer that would render the apparatus impracticable for use by unskilled labor. The provision of equalizing the pressures at the meter inlet and outlet also insures that the meter and conduits will be completely filled with air at all times, thus improving the accuracy of the measurement.

In Figs. 6 to 8, inclusive, is illustrated another and preferred type of my improved apparatus which is identical with that heretofore described as regards the relation of the piping and the meter, but differs therefrom in the employment of a single treadle 41. This treadle is hingedly mounted on a bar 42 which is bridged between the rear legs 12 and has pivotally connected thereto the lower end of a rod 43 whose upper end is pivotally connected to the arm 28 fastened on the extension of the valve plug 26, as heretofore described, the rod 43 corresponding to the rod 30. A second rod 44 has its lower end pivotally connected to the treadle 41 and at its upper end, just beneath the under surface of the table 10, is provided with a pair of spring members 45, each of which has a hook 46 for seating in a notch 47 formed in the lower end of a rod 48. The latter rod projects upwardly through a suitable aperture provided in the top of the table 10 and also through the offset portion of a strap 49 mounted thereon. The upper end of the rod 48 has attached thereto a stop 50 which corresponds to, and is placed similarly to the stop 36, relative to the pointer 21. Above the strap member 49, a collar 51 is fixed to the rod 48 and a coil spring 52 encircles the rod between the collar 51 and the strap member 49 and so tends to maintain the stop 50 in its pointer-interrupting position. The upward movement of the rod 48 under the impulse of the spring 52 is limited by a collar 53 which is also fixed to the rod and disposed beneath and engaging with the strap 49. A second collar 54 is mounted on the rod 48 between the collar 53 and a plate 55 fixed to the upper surface of the table 10.

Assuming the same conditions as regards air pressure and relation of the parts as discussed in connection with the apparatus shown in Fig. 1, pressure at the inlet and outlet of the meter shown in Fig. 6 is equalized to thereby prevent any strain on the pointer 21 and the stop 50 is in pointer-interrupting position. The operator then places the crown end of a hog bung over the nozzle 26a and closes the bung at an appropriate distance from the nozzle. The treadle 41 is then moved downwardly to a position where the collar 54 just contacts with the plate 55, or to some position just short of this plate such that the stop 50 is moved below the lower end of the pointer, thus freeing this member for movement. The same movement of the treadle also shifts the valve plug 26 from the position shown in Fig. 4 to that shown in Fig. 5 to thereby direct the flow of air through the meter and then to the interior of the hog bung. As before, this flow of air continues until the hog bung is filled when the pointer ceases to move because of the back pressure created, whereupon the operator can observe the size of the particular bung being measured and remove the same from the nozzle.

The treadle 41 is then further depressed sufficiently to disengage the hooks 46 from the notches 47 and thereby permit the stop 50 to be returned to pointer-interrupting position under the impulse of the spring 52. It will be understood that the valve plug 26 and the passages therein are so disposed with reference to the connecting pipes that this further downward movement of the treadle 41 maintains a connection between the pipes 22 and 25 and so insures a continuous flow of air through the meter for the purpose of rotating the pointer 21 until it contacts with the stop 50. The treadle 41 is then released for upward movement which returns the valve plug 26 to the position shown in Fig. 4 and so equalizes the pressure at the inlet and outlet of the meter. The hooks 46 and notches 47 are also reengaged by the same movement of the treadle. The apparatus is then conditioned for measuring the next hog bung.

Either of the foregoing apparatus provides a convenient and extremely accurate measurement of the stuffing capacity of hog bungs, regardless of their irregular shape, because the measurement is of a volumetric nature and therefore provides the exact information desired both by the manufacturer of the casings and by the sausage maker. Moreover, the provision of conditioning the apparatus subsequent to each measurement, so as to place the pointer element thereof in a zero position prior to the taking of the next measurement enables the apparatus to be successfully used by unskilled labor, since the measurement is always taken from a definite and fixed point.

I claim:

1. Apparatus for determining the capacity of a hollow article comprising in combination, a gas meter having dial mechanism provided with a zero position and operable when gas is flowing through the meter, stop means normally interrupting the operation of the mechanism and holding the same in zero position, conduit means for connecting the article to the delivery side of the meter, the stop means being shiftable to free the mechanism for operation to register the amount of gas required to fill the article, and means for returning the stop means to interrupting position to reestablish the zero of the mechanism.

2. Apparatus for determining the capacity of a hollow article comprising in combination, a gas meter having a calibrated dial provided with a zero marking and a pointer operable over the dial when gas is flowing through the meter, a stop for normally holding the pointer in registration with the zero of the dial, conduit means for connecting the article to the delivery side of the meter, and means for shifting the stop to free the pointer for movement to register the amount of gas required to fill the article, and for returning the stop to reestablish the zero position of the pointer upon the completion of the measurement.

3. Apparatus for determining the capacity of a hollow article comprising in combination, a gas meter having dial mechanism provided with a zero position and operable when gas is flowing through the meter, stop means normally interrupting the operation of the mechanism and holding the same in zero position, conduit means for connecting the article to the delivery side of the meter, the stop means being shiftable to free the mechanism for operation to register the amount of gas required to fill the article, means for returning the stop means to its interrupting position to reestablish the zero of the mechanism, and means for equalizing the pressure at the inlet and outlet of the meter after the stop means has been reset.

4. Apparatus for determining the capacity of a hollow article comprising in combination, a gas meter having a calibrated dial provided with a zero marking and a pointer operable over the dial when gas is flowing through the meter, a stop for holding the pointer in registration with the zero of the dial, conduit means for connecting the article to the delivery side of the meter, means for shifting the stop to free the pointer for movement to register the amount of gas required to fill the article and for returning the stop to reestablish the zero position of the pointer, and means for equalizing the pressure at the inlet and outlet of the meter after the stop means has been reset.

5. Apparatus for determining the capacity of a hollow article comprising in combination, a gas meter having dial mechanism provided with a zero position and operable when gas is flowing through the meter, stop means normally interrupting the operation of the mechanism and holding the same in zero position, conduit means for connecting the article to the delivery side of the meter, means for equalizing the pressure at the inlet and outlet of the meter while the stop means is in interrupting position, and means for shifting the stop means and for effecting a uni-directional flow through the meter from the inlet to the outlet thereof to register the amount of gas required to fill the article.

6. Apparatus for determining the capacity of a hollow article comprising in combination, a gas meter having dial mechanism provided with a zero position and operable when gas is flowing through the meter, stop means normally interrupting the operation of the mechanism and holding the same in zero position, conduit means for connecting the article to the delivery side of the meter, means for equalizing the pressure at the inlet and outlet of the meter while the stop means is in interrupting position, and means for simultaneously shifting the stop means and for effecting a uni-directional flow through the meter from the inlet to the outlet thereof to register the amount of gas required to fill the article.

7. Apparatus for determining the capacity of a hollow article comprising in combination, a gas meter having dial mechanism provided with a zero position and operable when gas is flowing through the meter, stop means normally interrupting the operation of the mechanism and holding the same in zero position, conduit means for connecting the article to the delivery side of the meter, means for equalizing the pressure at the inlet and outlet of the meter while the stop means is in interrupting position, means for shifting the stop means and for effecting a uni-directional flow through the meter from the inlet to the outlet thereof to register the amount of gas required to fill the article, and means for returning the stop means to interrupting position in advance of reestablishing the equalization of pressure on the meter.

8. Apparatus for determining the capacity of a hollow article comprising in combination, a gas meter having dial mechanism provided with a zero position and operable when gas is flowing through the meter, stop means normally interrupting the operation of the mechanism and holding the same in zero position, conduit means for connecting the article to the delivery side of the meter, means for equalizing the pressure at the inlet and outlet of the meter while the stop means is in interrupting position, means for simultaneously shifting the stop means and for effecting a uni-directional flow through the meter from the inlet to the outlet thereof to register the amount of gas required to fill the article, and means for returning the stop means to interrupting position in advance of reestablishing the equalization of pressure on the meter.

9. Apparatus for determining the capacity of a hollow article comprising in combination, a gas meter having a dial mechanism provided with a zero position and operable when gas is flowing through the meter, an inlet pipe and an outlet pipe connected to the meter, respectively, a delivery pipe for connection to the article, valve means shiftable to alternately connect the outlet pipe to the inlet and delivery pipes, respectively, stop means normally interrupting the operation of the mechanism and holding the same in zero position, the valve means connecting the inlet and outlet pipes externally of the meter, when the stop means is in interrupting position, to thereby equalize the inlet and outlet pressures on the meter, means for shifting the stop means and the valve means to connect the outlet and delivery pipes to thereby free the mechanism for operation to register the amount of gas required to fill the article, and means for returning the stop means to interrupting position in advance of shifting the valve means to again connect the inlet and outlet pipes.

10. Apparatus for determining the capacity of a hollow article comprising in combination, a gas meter having a calibrated dial provided with a zero marking and a pointer operable by the meter over the dial when gas is flowing through the meter, an inlet pipe and an outlet pipe connected to the meter, respectively, a delivery pipe for connection to the article, valve means shiftable to alternately connect the outlet pipe to the inlet and delivery pipes, respectively, a stop for holding the pointer in registration with the zero of the dial, the valve means connecting the inlet and outlet pipes externally of the meter, when the stop is in interrupting position, to thereby equalize the inlet and outlet pressures on the meter, means for shifting the stop and the valve means to connect the outlet and delivery pipes to thereby free the pointer for movement over the dial to register the amount of gas required to fill the article, and means for returning the stop to interrupting position while maintaining the connection of the outlet and delivery pipes until the pointer again contacts with the stop.

11. Apparatus for determining the capacity of a hollow article comprising in combination, a gas meter having a dial mechanism provided with a zero position and operable when gas is flowing through the meter, an inlet pipe and an outlet pipe connected to the meter, respectively, a delivery pipe for connection to the article, valve means shiftable to alternately connect the outlet pipe to the inlet and delivery pipes, respectively, stop means normally interrupting the operation of the mechanism and holding the same in zero position, the valve means connecting the inlet and outlet pipes externally of the meter, when the stop means is in interrupting position, to thereby equalize the inlet and outlet pressures on the meter, means for simultaneously shifting the stop and valve means to connect the outlet and delivery pipes to thereby free the mechanism for operation to register the amount of gas required to fill the article, and means for returning the stop means to interrupting position in advance of reestablishing the equalization of the pressure on the meter.

12. Apparatus for determining the capacity of a hollow article comprising in combination, a gas meter having a dial mechanism provided with a zero position and operable when gas is flowing through the meter, an inlet pipe and an outlet pipe connected to the meter, respectively, a delivery pipe for connection to the article, valve means shiftable to alternately connect the outlet pipe to the inlet and delivery pipes, respectively, a first treadle for operating the valve means, stop means normally interrupting the operation of the mechanism and holding the same in zero position, the valve means connecting the inlet and outlet pipes externally of the meter, when the stop means is in interrupting position, to thereby equalize the inlet and outlet pressures on the meter, a second treadle for shifting the stop means, the treadles being operable together in one direction for shifting the stop means and valve means to connect the outlet and delivery pipes to thereby free the mechanism for operation to register the amount of gas required to fill the article, and the second treadle being adapted for independent operation in the opposite direction for returning the stop means to interrupting position in advance of shifting the valve means to again connect the inlet and outlet pipes.

13. Apparatus for determining the capacity of a hollow article comprising in combination, a gas meter having a dial mechanism provided with a zero position and operable when gas is flowing through the meter, an inlet pipe and an outlet pipe connected to the meter, respectively, a delivery pipe for connection to the article, valve means shiftable to alternately connect the outlet pipe to the inlet and delivery pipes, respectively, a first treadle for operating the valve means, stop means normally interrupting the operation of the mechanism and holding the same in zero position, a first spring for retaining the stop means in interrupting position, the valve means connecting the inlet and outlet pipes externally of the meter, when the stop means is in interrupting position, to thereby equalize the inlet and outlet pressures on the meter, a second spring for holding the valve means in the last named connecting position, a second treadle for shifting the stop means, and a bar carried by the first treadle and extending under the second treadle whereby the treadles are adapted for simultaneous actuation in one direction when the second treadle is depressed for shifting the stop means and the valve means to connect the outlet and delivery pipes to thereby free the mechanism for operation to register the amount of gas required to fill the article, and the second treadle is adapted for independent operation in the opposite direction under the impulse of the first spring for returning the stop means to interrupting position in advance of shifting the valve means to again connect the inlet and outlet pipes.

14. Apparatus for determining the capacity of a hollow article comprising in combination, a gas meter having a dial mechanism provided with a zero position and operable when gas is flowing through the meter, an inlet pipe and an outlet pipe connected to the meter, respectively, a delivery pipe for connection to the article, valve means shiftable to alternately connect the outlet pipe to the inlet and delivery pipes, respectively, stop means normally interrupting the operation of the mechanism and holding the same in zero position, the valve means connecting the inlet and outlet pipes externally of the meter, when the stop means is in interrupting position, to thereby equalize the inlet and outlet pressures on the meter, a treadle connected to the valve means and detachably connected to the stop means for simultaneously actuating both of said means and to connect the outlet and delivery pipes to thereby free the mechanism for operation to register the amount of gas required to fill the article, means for severing the connection of the treadle to the stop means when the article is filled, and a spring for returning the stop means to interrupting position in advance of a shifting of the valve means to again connect the inlet and outlet pipes.

15. Apparatus for separately determining the volume of a plurality of hollow articles comprising in combination, means for supplying gas at a predetermined pressure, a gas meter having an inlet and an outlet provided with means for attaching an article thereto for filling, and means for alternately connecting the gas supply to the inlet, and simultaneously to the inlet and outlet, the connections occurring during the filling and measuring of one article, and the removal and replacing of another article for filling, respectively, whereby the meter is completely filled with gas at all times.

CHARLES B. DUSHANE, Jr.